US009407762B2

(12) United States Patent
Keys et al.

(10) Patent No.: US 9,407,762 B2
(45) Date of Patent: Aug. 2, 2016

(54) PROVIDING ENHANCED USER AUTHENTICATION FUNCTIONALITIES

(71) Applicant: Bank of America Corporation, Charlotte, NC (US)

(72) Inventors: Andrew T. Keys, Albany, OR (US); Mark A. Pender, Rockville Center, NY (US); Jennifer Pacholski, Swanville, ME (US)

(73) Assignee: Bank of America Corporation, Charlotte, NC (US)

(*) Notice: Subject to any disclaimer, the term of this patent is extended or adjusted under 35 U.S.C. 154(b) by 154 days.

(21) Appl. No.: 14/511,252

(22) Filed: Oct. 10, 2014

(65) Prior Publication Data

US 2016/0105546 A1    Apr. 14, 2016

(51) Int. Cl.
*H04M 1/64* (2006.01)
*H04M 3/38* (2006.01)
*H04M 3/493* (2006.01)

(52) U.S. Cl.
CPC .............. *H04M 3/382* (2013.01); *H04M 3/493* (2013.01)

(58) Field of Classification Search
CPC ..... H04M 3/382; H04M 3/493; H04M 3/436; H04Q 2213/13095
USPC .............................. 379/88.01, 142.05, 207.13
See application file for complete search history.

(56) References Cited

U.S. PATENT DOCUMENTS

| 5,907,547 | A * | 5/1999 | Foladare | H04L 29/06 370/352 |
| 6,456,699 | B1 * | 9/2002 | Burg | H04M 1/64 379/201.03 |
| 7,577,664 | B2 * | 8/2009 | Malik | G06F 17/30864 |
| 7,986,771 | B2 * | 7/2011 | Feng | H04M 7/0015 379/354 |
| 8,223,929 | B2 * | 7/2012 | Sylvain | H04M 3/493 370/352 |
| 2009/0003543 | A1 * | 1/2009 | Altberg | H04M 3/42 379/88.13 |
| 2009/0172402 | A1 * | 7/2009 | Tran | G06Q 20/102 713/170 |
| 2012/0192090 | A1 | 7/2012 | Patterson et al. | |
| 2012/0310828 | A1 | 12/2012 | Hu | |
| 2013/0024916 | A1 | 1/2013 | Evans | |

(Continued)

*Primary Examiner* — Van D Huynh
(74) *Attorney, Agent, or Firm* — Banner & Witcoff, Ltd.; Michael A. Springs

(57) ABSTRACT

Methods, systems, apparatuses, and computer-readable media for providing enhanced user authentication functionalities are presented. In one or more embodiments, a server computing device may authenticate a user of a user computing device to a customer portal. Subsequently, the server computing device may receive a click-to-call request from the user computing device. In response to receiving the click-to-call request, the server computing device may generate a one-time passcode for the user. Then, the server computing device may provide the one-time passcode to the user. Thereafter, the server computing device may receive one-time-passcode input from an interactive voice response (IVR) server, and such input may be received from a caller. The server computing device then may validate the one-time-passcode input based on the one-time passcode provided to the user. In response to validating the one-time-passcode input, the server computing device may cause the IVR server to authenticate the caller as the user.

20 Claims, 13 Drawing Sheets

(56) References Cited

U.S. PATENT DOCUMENTS

| | | |
|---|---|---|
| 2013/0036048 A1 | 2/2013 | Campos et al. |
| 2013/0041821 A1 | 2/2013 | Kingston et al. |
| 2013/0054470 A1 | 2/2013 | Campos et al. |
| 2013/0091058 A1 | 4/2013 | Huster |
| 2013/0132093 A1 | 5/2013 | Gross |
| 2013/0179242 A1 | 7/2013 | Kaplan |
| 2013/0204785 A1 | 8/2013 | Monk et al. |
| 2013/0214042 A1 | 8/2013 | Kingston et al. |
| 2013/0218777 A1 | 8/2013 | Kingston et al. |
| 2013/0304642 A1 | 11/2013 | Campos |
| 2014/0006048 A1 | 1/2014 | Liberty |
| 2014/0020084 A1 | 1/2014 | Gross |
| 2014/0037074 A1* | 2/2014 | Bravo .................. H04W 12/06 379/88.01 |
| 2014/0074717 A1 | 3/2014 | Evans |
| 2014/0122331 A1 | 5/2014 | Vaish et al. |
| 2014/0143089 A1 | 5/2014 | Campos et al. |
| 2014/0195425 A1 | 7/2014 | Campos et al. |
| 2014/0250512 A1 | 9/2014 | Goldstone et al. |
| 2014/0270093 A1 | 9/2014 | Lum et al. |
| 2014/0270105 A1 | 9/2014 | Tamblyn et al. |
| 2014/0270141 A1 | 9/2014 | Filonov et al. |
| 2014/0270142 A1 | 9/2014 | Bischoff et al. |
| 2014/0270154 A1 | 9/2014 | Lum et al. |
| 2014/0280720 A1 | 9/2014 | Bischoff et al. |
| 2014/0297438 A1 | 10/2014 | Dua |
| 2014/0316786 A1 | 10/2014 | Gross |
| 2014/0344149 A1 | 11/2014 | Campos |
| 2014/0358783 A1 | 12/2014 | Mansur |

\* cited by examiner

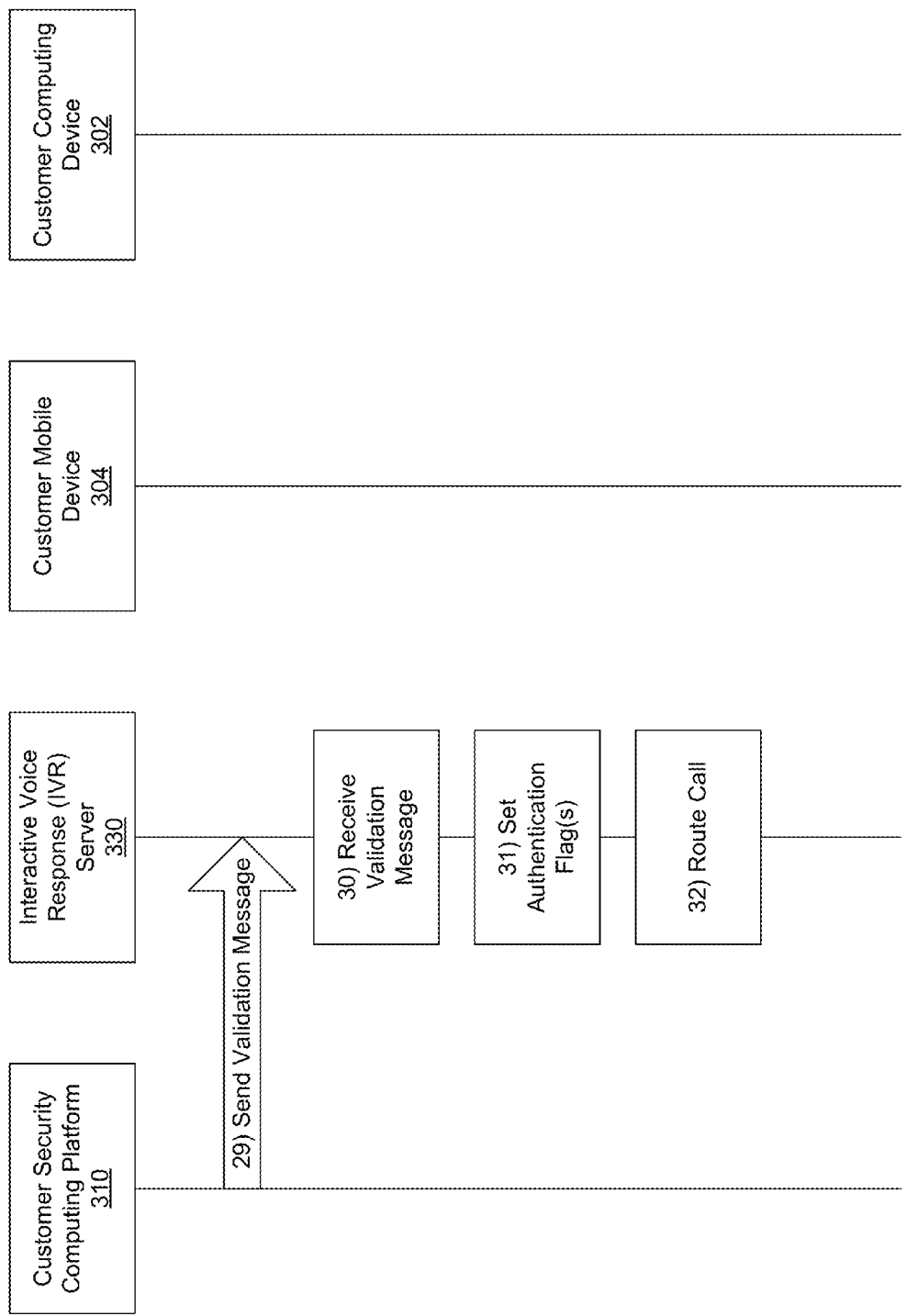

PROVIDING ENHANCED USER AUTHENTICATION FUNCTIONALITIES

BACKGROUND

Aspects of the disclosure relate to computer hardware and software. In particular, one or more aspects of the disclosure generally relate to computer hardware and software for providing enhanced user authentication functionalities.

Large organizations, such as financial institutions, may serve many customers, and increasingly, customers of such organizations are using computing devices, including mobile computing devices, to interact with the organizations about the products and/or services offered by these organizations. Some large organizations may even provide specialized websites and/or customer portals for their customers that allow customers to view and/or purchase various products and/or services online, conduct transactions, and view and/or manage one or more accounts. Although many customers are increasingly using these specialized websites and customer portals to interact with organizations, some customers might still need to speak with a customer service representative from time-to-time to obtain additional assistance from the organization, for instance, via a telephone call.

In some instances, security risks may arise as customers communicate with an organization using different channels, such as via a customer portal website and over the phone. Additionally, while large organizations may take many steps to ensure the security of customer information and/or user accounts, these organizations may wish to continue pursuing ever greater levels of security in protecting customer information and/or user accounts.

SUMMARY

Aspects of the disclosure relate to various systems and techniques that provide effective, efficient, scalable, and convenient ways of increasing the security of customer information and customer accounts, particularly in ways that provide for enhanced security in instances in which a customer is authenticated via a customer portal or website and subsequently requests to speak with a customer service representative on the phone.

For example, some aspects of the disclosure provide ways of carrying over a customer's authentication status from their web session to a new telephone session. By implementing these techniques, an organization may be able to better secure the customer's information and interactions with the organization, while also providing a more convenient user experience to the customer, as the customer might not need to submit additional authentication credentials when initiating a telephone session with an interactive voice response (IVR) server and/or with a customer service representative. In addition, contextual information describing aspects of the customer's web session may be captured and used in routing the customer's telephone call to an appropriate associate who can also receive an indication about what the customer was doing online so as to pick up where the online customer portal left off.

As illustrated in greater detail below, in one or more arrangements, a customer may select a "click-to-call" button presented in a customer portal. A server providing the customer portal may generate a one-time passcode which may be presented in the customer portal and may initiate a telephone call to the customer (or, in some instances, may cause an IVR server to initiate such a telephone call). Upon receiving the telephone call, the customer may enter the one-time passcode by providing touch-tone input on their telephone, and based on validating the customer's input, the server may authenticate the customer and allow them to access account information over the phone (e.g., without providing additional authentication credentials beyond the one-time passcode). In this way, the customer's authentication from their web session may be carried over to their phone session, providing for greater security and increased convenience. Additionally, in some instances, the customer's telephone call may be routed to a specific customer service representative based on contextual information which is captured during the customer's web session and which may be indicative of the customer's need(s) for contacting the organization and requesting additional assistance over the phone.

In accordance with one or more embodiments, a server computing device (which may, e.g., incorporate one or more aspects of a computing platform, such as one or more processors, memory, and/or communication interfaces, as discussed in greater detail below) may authenticate a user of a user computing device to a customer portal provided by the server computing device. Subsequently, the server computing device may receive a click-to-call request from the user computing device. In response to receiving the click-to-call request from the user computing device, the server computing device may generate a one-time passcode for the user of the user computing device. Then, the server computing device may provide the one-time passcode to the user of the user computing device. Thereafter, the server computing device may receive one-time-passcode input from an interactive voice response (IVR) server, and the one-time-passcode input may correspond to input provided to the IVR server by a caller. The server computing device then may validate the one-time-passcode input based on the one-time passcode provided to the user of the user computing device. In response to validating the one-time-passcode input, the server computing device may cause the IVR server to authenticate the caller as the user of the user computing device.

In some embodiments, providing the one-time passcode to the user of the user computing device may include sending the one-time passcode to the user computing device. Additionally or alternatively, providing the one-time passcode to the user of the user computing device may include sending the one-time passcode to one or more registered addresses associated with the user of the user computing device. In some instances, the one or more registered addresses associated with the user of the user computing device may include at least one email address associated with the user of the user computing device. Additionally or alternatively, the one or more registered addresses associated with the user of the user computing device may include at least mobile telephone number associated with the user of the user computing device.

In some embodiments, prior to receiving the one-time-passcode input from the IVR server, the server computing device may cause the IVR server to initiate a telephone call to the caller. In some instances, the telephone call may be initiated to a registered telephone number associated with the user of the user computing device. In other instances, the telephone call may be initiated to a telephone number provided by the user of the user computing device in response to a prompt generated by the server computing device after receiving the click-to-call request.

In other embodiments, prior to receiving the one-time-passcode input from the IVR server, the server computing device may send, to the IVR server, information associated with an expected telephone call corresponding to the click-to-call request.

In some embodiments, causing the IVR server to authenticate the caller as the user of the user computing device may include causing the IVR server to route the caller to a specific endpoint determined by the server computing device. Additionally or alternatively, causing the IVR server to authenticate the caller as the user of the user computing device may include sending contextual information associated with the user's interaction with the customer portal to the IVR server. In some embodiments, the IVR server may be configured to use the contextual information in routing the caller to an endpoint. Additionally or alternatively, the IVR server may be configured to provide the contextual information to a customer service representative to which the caller is routed.

BRIEF DESCRIPTION OF THE DRAWINGS

The present disclosure is illustrated by way of example and not limited in the accompanying figures in which like reference numerals indicate similar elements and in which:

FIGS. 4A-4H depict an illustrative event sequence for providing enhanced user authentication functionalities in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
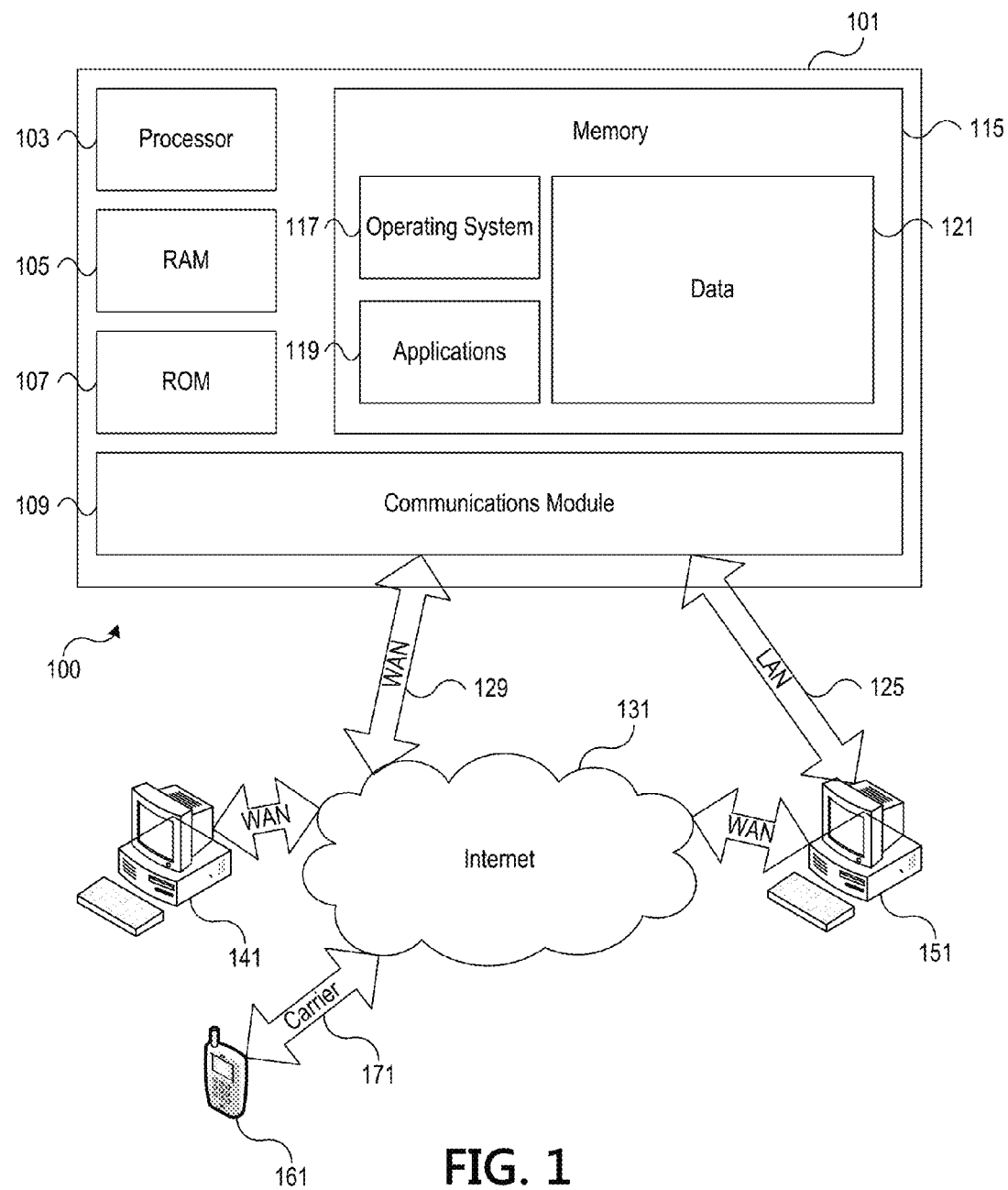
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
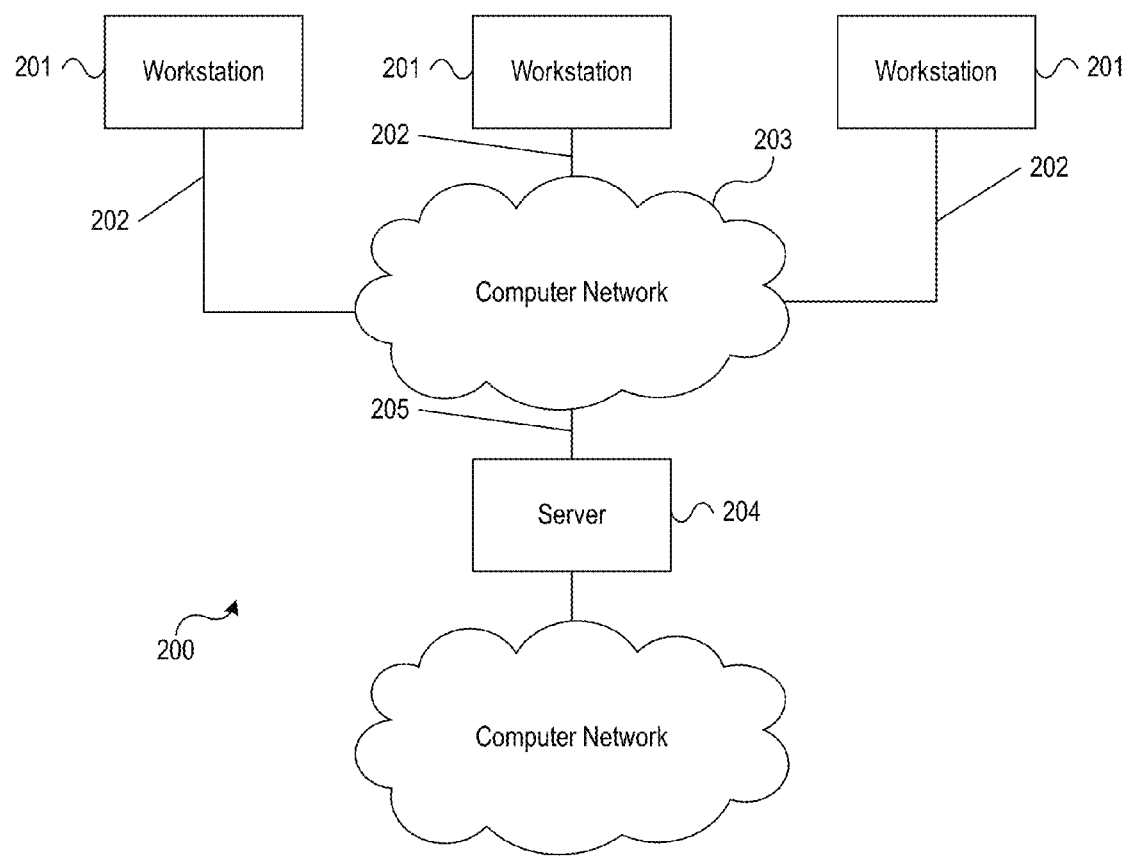
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
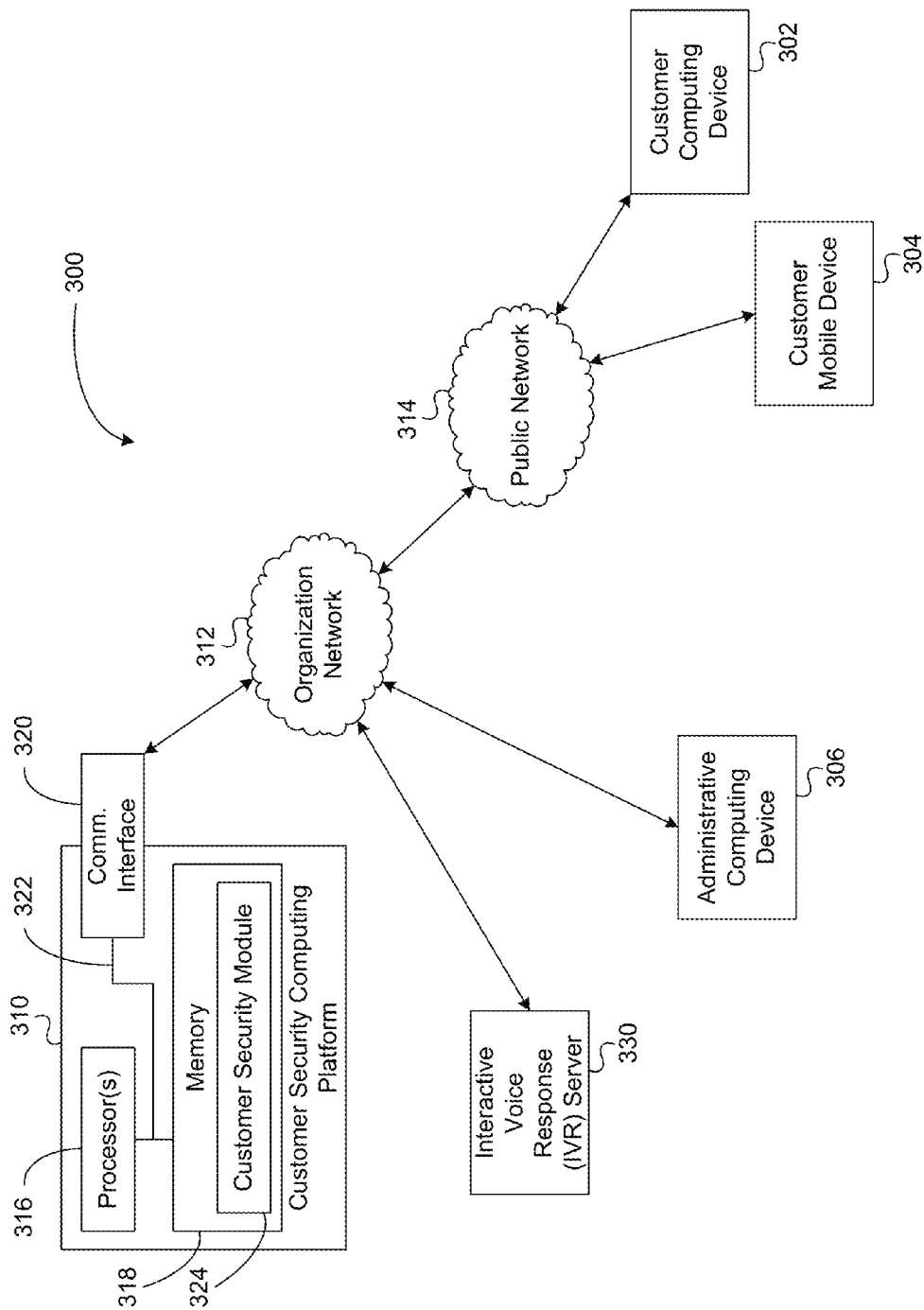
FIG. 3 depicts an illustrative computing environment for providing enhanced user authentication functionalities in accordance with one or more example embodiments.

FIG. 3 depicts an illustrative computing environment for providing enhanced user authentication functionalities in accordance with one or more example embodiments. Referring to FIG. 3, computing environment 300 may include one or more computing devices. For example, computing environment 300 may include a customer computing device 302 (which may, e.g., be used by a customer of an organization, such as a customer of a financial institution). Computing environment 300 may further include a customer mobile device 304 (which may, e.g., be a mobile computing device that is used by, linked to, and/or otherwise associated with the user of customer computing device 302). Computing environment 300 also may include an administrative computing device 306 (which may, e.g., be used by and/or operated by an administrative user or other individual who may be associated with the organization and who may administer and/or otherwise control various computing devices and/or computer systems that are operated by and/or otherwise associated with the organization) and an interactive voice response (IVR) server 330 (which may, e.g., be configured to place and/or receive telephone calls; process and respond to numerical and/or voice input received via one or more telephone connections; access, create, and/or modify data stored by one or more other computing devices and/or otherwise interact with one or more other computing devices; and/or provide various other telephony services). Customer computing device 302, customer mobile device 304, administrative computing device 306, and IVR server 330 may be any type of computing device capable of receiving a user interface, receiving input via the user interface, and communicating the received input to one or more other computing devices. For example, customer computing device 302, customer mobile device 304, administrative computing device 306, and IVR server 330 may be a desktop computer, laptop computer, tablet computer, smart phone, or the like. Computing environment 300 also may include one or more computing platforms. For example, computing environment 300 may include customer security computing platform 310. Customer security computing platform 310 may include one or more computing devices configured to perform one or more of the functions described herein. For example, customer security computing platform 310 may include one or more computers (e.g., laptop computers, desktop computers, servers, server blades, or the like).

Computing environment 300 also may include one or more networks, which may interconnect one or more of customer computing device 302, customer mobile device 304, administrative computing device 306, IVR server 330, and customer security computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, administrative computing device 306, IVR server 330 and customer security computing platform 310 may be associated with an organization (e.g., a financial institution), and organization network 312 may be associated with and/or operated by the organization, and may include one or more networks (e.g., LANs, WANs, VPNs, or the like) that interconnect administrative computing device 306, IVR server 330 and customer security computing platform 310 and one or more other computing devices and/or computer systems that are used by, operated by, and/or otherwise associated with the organization. Public network 314 may connect organization network 312 and/or one or more computing devices connected thereto (e.g., administrative computing device 306, IVR server 330 and customer security computing platform 310) with one or more networks and/or computing devices that are not associated with the organization. For example, customer computing device 302 and customer mobile device 304 might not be associated with an organization that operates organization network 312, and public network 314 may include one or more networks (e.g., the Internet) that connect customer computing device 302 and customer mobile device 304 to organization network 312 and/or one or more computing devices connected thereto (e.g., administrative computing device 306, IVR server 330 and customer security computing platform 310).

Customer security computing platform 310 may include one or more processor(s) 316, memory 318, communication interface 320, and data bus 322. Data bus 322 may interconnect processor(s) 316, memory 318, and/or communication interface 320. Communication interface 320 may be a network interface configured to support communication between customer security computing platform 310 and organization network 312, or one or more sub-networks thereof. Memory 318 may include one or more program modules comprising instructions that when executed by the processor(s) 316 cause customer security computing platform 310 to perform one or more functions described herein. For example, memory 318 may include customer security module 324, which may comprise instructions that when executed by processor(s) 316 cause customer security computing platform 310 to perform one or more functions described herein.

Figure 4A:
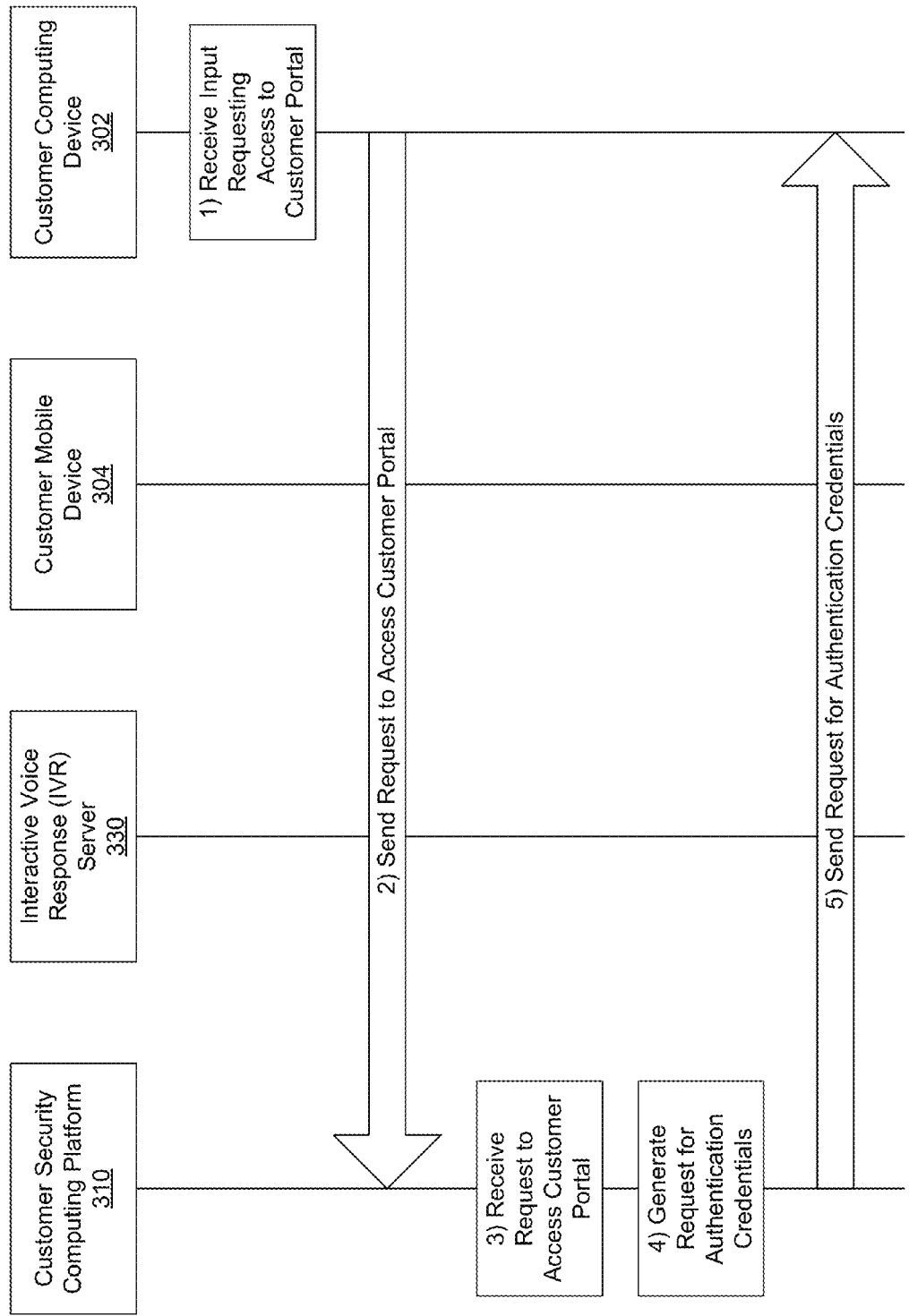
Figure 4B:
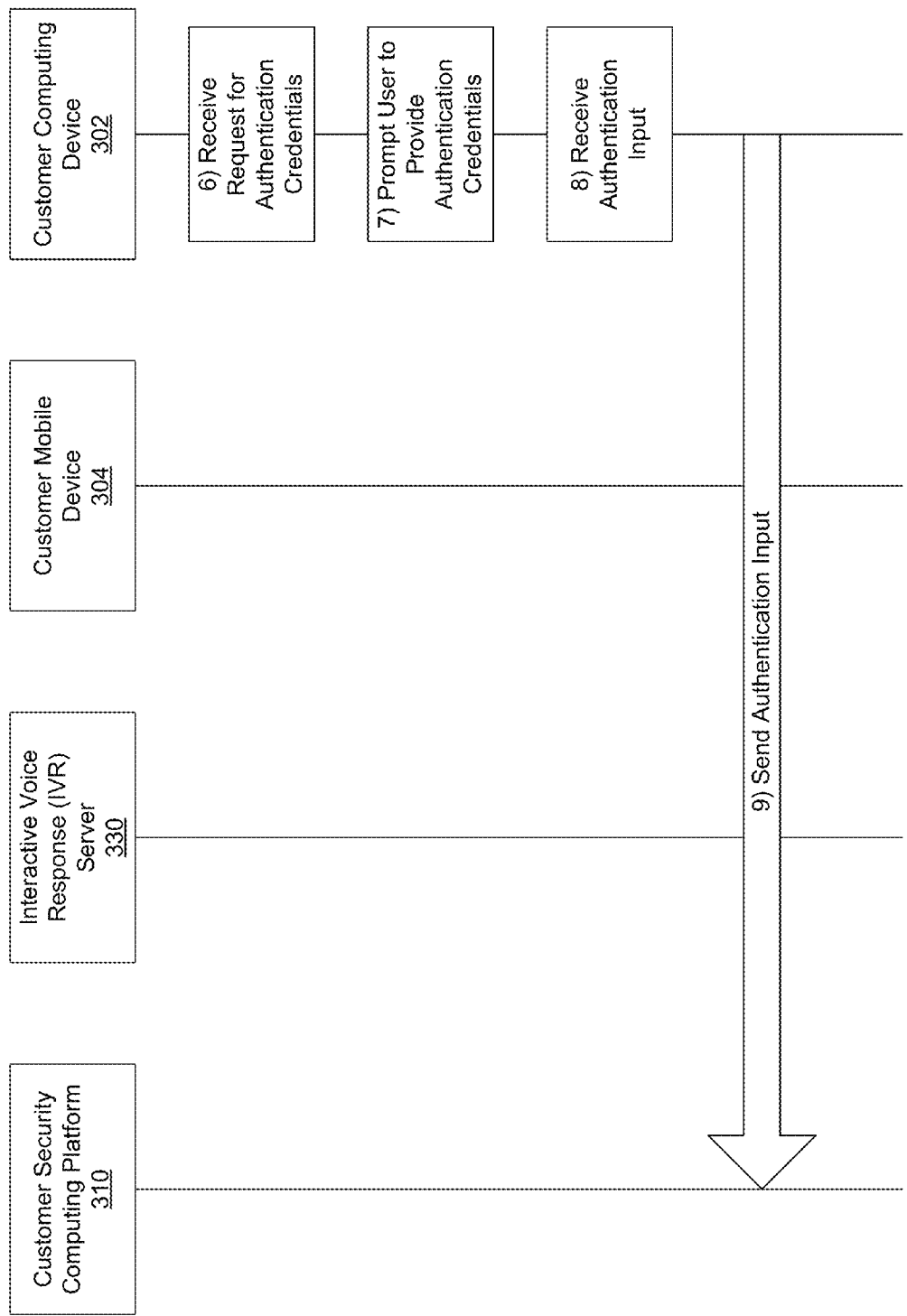
Figure 4C:
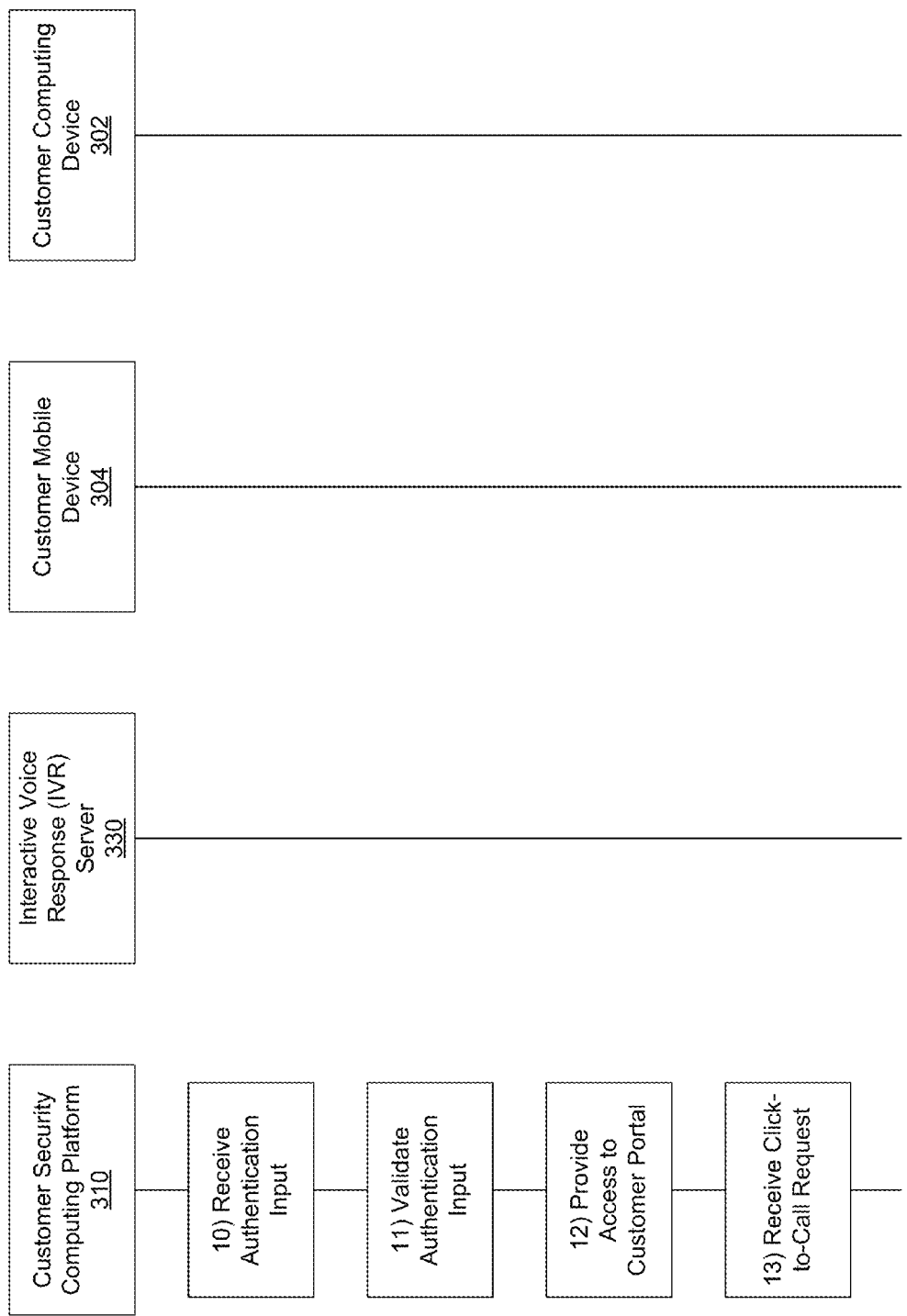
Figure 4D:
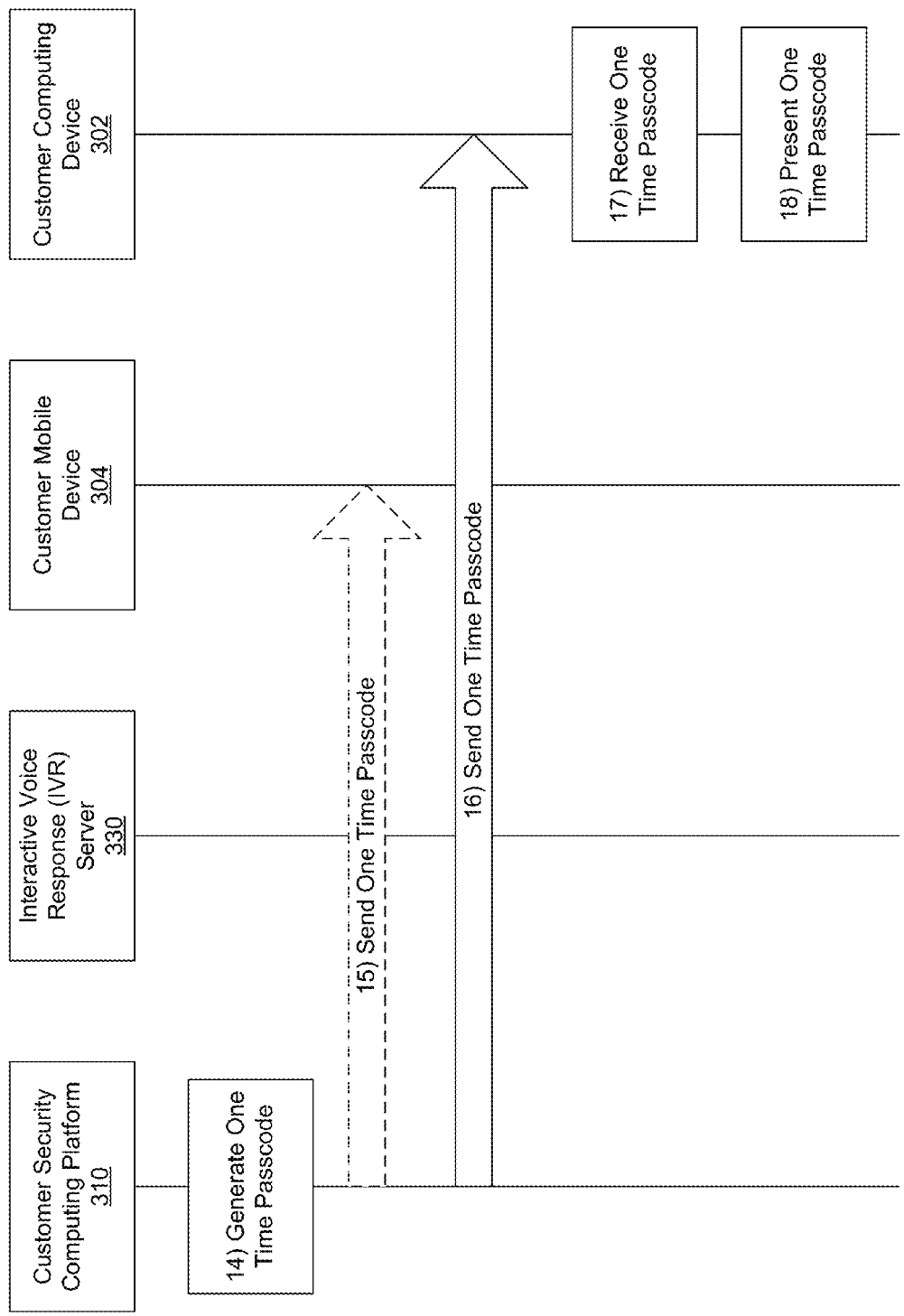

FIGS. 4A-4H depict an illustrative event sequence for providing enhanced user authentication functionalities in accordance with one or more example embodiments. Referring to FIG. 4A, at step 1, customer computing device 302 may receive input requesting access to a customer portal. For example, at step 1, customer computing device 302 may receive input from a user of customer computing device 302 request access to a customer portal. Such a customer portal may, for instance, be a website that is provided by an organization for its customers and potential customers, and the website may include a number of interactive user interfaces via which customers and potential customers may access information associated with the organization. In some instances, the customer portal may, for example, be an online banking website that is provided by a financial institution, and the online banking website may include a number of interactive user interfaces that are configured to allow users to access financial account information, transfer funds between accounts, pay bills, request and/or perform other types of transactions using one or more financial accounts that may be maintained by the financial institution, and/or view other information associated with the financial institution.

At step 2, customer computing device 302 may send a request to access the customer portal to customer security computing platform 310. For example, after receiving input requesting access to the customer portal, customer computing device 302 may, at step 2, generate a request to access a customer portal and may send the request to customer security computing platform 310 (which may, e.g., be configured to provide one or more websites that may form the customer portal to which the user of customer computing device 302 has requested access).

At step 3 customer security computing platform 310 may receive the request to access the customer portal from customer computing device 302. At step 4, customer security computing platform 310 may generate a request for authentication credentials. For example, at step 4, customer security computing platform 310 may generate a graphical user interface that is configured to prompt a user to enter one or more authentication credentials, such as a username, password, one-time passcode, biometric input (e.g., voice biometric input, fingerprint biometric input, facial recognition biometric input, and/or other types of biometric input), and/or other credentials.

At step 5, customer security computing platform 310 may send the request for authentication credentials to customer computing device 302. At step 6, customer computing device 302 may receive the request for authentication credentials, and at step 7, customer computing device 302 may prompt the user of customer computing device 302 to provide one or more authentication credentials. For example, at step 7, customer computing device 302 may prompt the user of customer computing device 302 by presenting the graphical user interface that was generated by customer security computing platform 310 (e.g., at step 4).

At step 8, customer computing device 302 may receive authentication input. In receiving authentication input, customer computing device 302 may, for instance, receive input from the user of customer computing device 302 that includes a username, password, one-time passcode, biometric input (e.g., voice biometric input, fingerprint biometric input, facial recognition biometric input, and/or other types of biometric input), and/or other credentials that may be used in authenticating the user of customer computing device 302 to a customer portal provided by customer security computing platform 310.

At step 9, customer computing device 302 may send the authentication input to customer security computing platform 310. For example, at step 9, customer computing device 302 may send the authentication input received from the user of customer computing device 302 (e.g., at step 8) to customer security computing platform 310 for validation.

At step 10, customer security computing platform 310 may receive the authentication input from customer computing device 302. At step 11, customer security computing platform 310 may validate the authentication input received from customer computing device 302. For example, in validating the authentication input at step 11, customer security computing platform 310 may evaluate the authentication input received from customer computing device 302 to determine if the one or more authentication credentials provided by the user of customer computing device 302 and included in the authentication input are valid. If customer security computing platform 310 determines that the authentication input received from customer computing device 302 is invalid, then customer security computing platform 310 may generate one or more error messages and may send such error messages to customer computing device 302 (which may, e.g., cause customer computing device 302 to prompt the user of customer computing device 302 to provide correct authentication input). Alternatively, if customer security computing platform 310 determines that the authentication input received from customer computing device 302 is valid, then customer security computing platform 310 may authenticate the user of customer computing device 302 to a customer portal provided by customer security computing platform 310. In authenticating the user of customer computing device 302 to the customer portal provided by customer security computing platform 310, customer security computing platform 310 may, for instance, set and/or update one or more authentication flags that may allow the user of customer computing device 302 to access specific information and/or execute specific functions that may be provided via the customer portal provided by customer security computing platform 310. For example, in instances where customer security computing platform 310 provides an online banking website as the customer portal for a financial institution, customer security computing platform 310 may, in authenticating the user of customer computing device 302, set and/or update one or more authentication flags that may enable the user of customer computing device 302 to view account information via the customer portal, request and/or perform one or more transactions, transfer funds, pay bills, and/or view other information and/or perform other functions via the online banking website.

At step 12, customer security computing platform 310 may provide access to the customer portal. For example, at step 12, customer security computing platform 310 may provide customer computing device 302 and/or a user of customer computing device 302 with access to one or more graphical user interfaces and/or other information associated with the customer portal provided by customer security computing platform 310. Such access may, for instance, be provided in accordance with and/or otherwise based on the one or more authentication flags that may have been set by customer security computing platform 310 (e.g., at step 11) after validating the authentication input provided by the user of customer computing device 302.

At step 13, customer security computing platform 310 may receive a click-to-call request. For example, at step 13, customer security computing platform 310 may receive a click-to-call request from customer computing device 302. Such a click-to-call request may, for instance, be received as input from a user of customer computing device 302 via the customer portal provided by customer security computing platform 310. For example, the click-to-call request may result from and/or correspond to a user selecting one or more controls (e.g., a "click to call" button or other similar control that may allow the user to request telephonic assistance from a customer service representative affiliated with the organization) that may be included in a graphical interface that is part of the customer portal provided by customer security computing platform 310.

At step 14, customer security computing platform 310 may generate a one-time passcode. For example, in response to receiving the click-to-call request from customer computing device 302, customer security computing platform 310 may generate a one-time passcode for the user of customer computing device 302. Such a one-time passcode may, for instance, be generated by customer security computing platform 310 using a random number generator and may include a string of alphanumeric characters of a predefined length (e.g., eight characters, twelve characters, sixteen characters, and/or the like).

At step 15, customer security computing platform 310 may send the one-time passcode to customer mobile device 304. For example, in some instances, customer security computing platform 310 may send the one-time passcode (which may, e.g., be generated by customer security computing platform 310 at step 14) to customer mobile device 304 and/or one or more other devices (which may, e.g., be pre-registered by the user of customer computing device 302 with customer security computing platform 310 to receive one-time passcodes), as discussed in greater detail below. In other instances, instead of (or in addition to) sending the one-time passcode to customer mobile device 304 and/or one or more other pre-registered devices, customer security computing platform 310 may send the one-time passcode to customer computing device 302 for presentation to the user, as discussed below.

At step 16, customer security computing platform 310 may send the one-time passcode to customer computing device 302. For example, at step 16, customer security computing platform 310 may provide the one-time passcode to the user of customer computing device 302. As discussed in greater detail below, in different instances, customer security computing platform 310 may provide the one-time passcode to the user of customer computing device 302 in different ways.

In some embodiments, providing the one-time passcode to the user of the user computing device may include sending the one-time passcode to the user computing device. For example, in some instances, in providing the one-time passcode to the user of customer computing device 302, customer security computing platform 310 may send the one-time passcode to customer computing device 302, and customer computing device 302 subsequently may display and/or otherwise present the one-time passcode to the user of customer computing device 302.

In some embodiments, providing the one-time passcode to the user of the user computing device may include sending the one-time passcode to one or more registered addresses associated with the user of the user computing device. For example, in some instances, in providing the one-time passcode to the user of customer computing device 302, customer security computing platform 310 may send the one-time passcode to one or more registered addresses associated with the user of customer computing device 302. Such registered addresses may, for instance, be defined and/or otherwise registered with customer security computing platform 310 by the user of customer computing device 302 in advance of the click-to-call request being submitted and/or received, such as during a user account creation and/or registration process performed by the user of customer computing device 302.

In some embodiments, the one or more registered addresses associated with the user of the user computing device may include at least one email address associated with the user of the user computing device. For example, in some instances, the one or more registered addresses (e.g., to which the one-time passcode may be sent by customer security computing platform 310) may include one or more email addresses that are used by and/or have been registered by the user of customer computing device 302. In these instances, the one-time passcode that is generated by customer security computing platform 310 may, for example, be sent to the user of customer computing device 302 via email.

In some embodiments, the one or more registered addresses associated with the user of the user computing device may include at least mobile telephone number associated with the user of the user computing device. For example, in some instances, the one or more registered addresses (e.g., to which the one-time passcode may be sent by customer security computing platform 310) may include one or more mobile telephone numbers that are used by and/or have been registered by the user of customer computing device 302. In these instances, the one-time passcode that is generated by customer security computing platform 310 may, for example, be sent to the user of customer computing device 302 via text message (e.g., in addition to or instead of via email and/or via one or more other ways).

Figure 5:
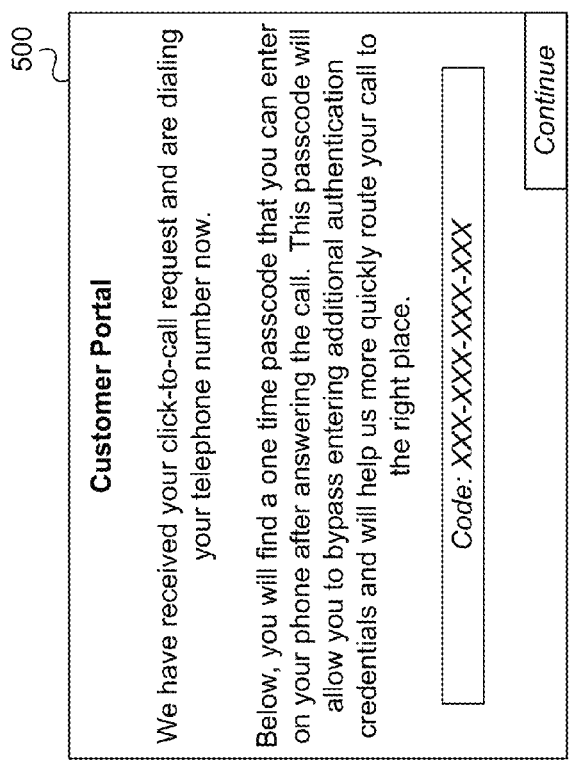

At step 17, customer computing device 302 may receive the one-time passcode from customer security computing platform 310. For example, in instances in which the one-time passcode is sent by customer security computing platform 310 to customer computing device 302 (e.g., as discussed above with respect to step 16), customer computing device 302 may receive the one-time passcode from customer security computing platform 310. At step 18, customer computing device 302 may present the one-time passcode. In presenting the one-time passcode, customer computing device 302 may, for example, display, cause to be displayed, and/or otherwise present one or more graphical user interfaces that include the one-time passcode and/or otherwise allow the user of customer computing device 302 to view the one-time passcode. For example, customer computing device 302 may present a graphical user interface similar to graphical user interface 500, which is illustrated in FIG. 5. As seen in FIG. 5, graphical user interface 500 may include one or more fields, controls, and/or other elements that are configured to present the one-time passcode to the user of customer computing device 302 and/or provide other information explaining how the one-time passcode may be used by the user of customer computing device 302 (e.g., to authenticate with IVR server 330). As noted above, by using a one-time passcode in this way, the user of customer computing device 302 may be able to more conveniently initiate a telephone session with IVR server 330 and/or a customer service representative of the organization, because after entering the one-time passcode on the phone, the user of customer computing device 302 might not need to provide any additional authentication credentials to continue interacting with IVR server 330 and/or with a customer service representative. In addition, by using a one-time passcode in this way, account security for the user of customer computing device 302 may be maintained and/or enhanced, as if, for instance, the user of customer computing device 302 provided an incorrect telephone number for IVR server 330 to dial and/or if IVR server 330 otherwise connects to the incorrect telephone number that is not used by the user of customer computing device 302, a person answering the phone would not have the one-time passcode and thus would not be able to access one or more financial accounts and/or other private information that may be linked to the user of customer computing device 302. Additionally or alternatively, in instances in which the one-time passcode is sent by customer security computing platform 310 to customer mobile device 304 and/or one or more other devices (e.g., and not sent to customer computing device 302), customer mobile device 304 and/or the one or more other devices receiving the one-time passcode may present the one-time passcode (e.g., similar to how customer computing device 302 may present the one-time passcode in the example discussed above), and the user of customer computing device 302 may obtain the one-time passcode by viewing the display(s) presented by such other devices.

Figure 4E:
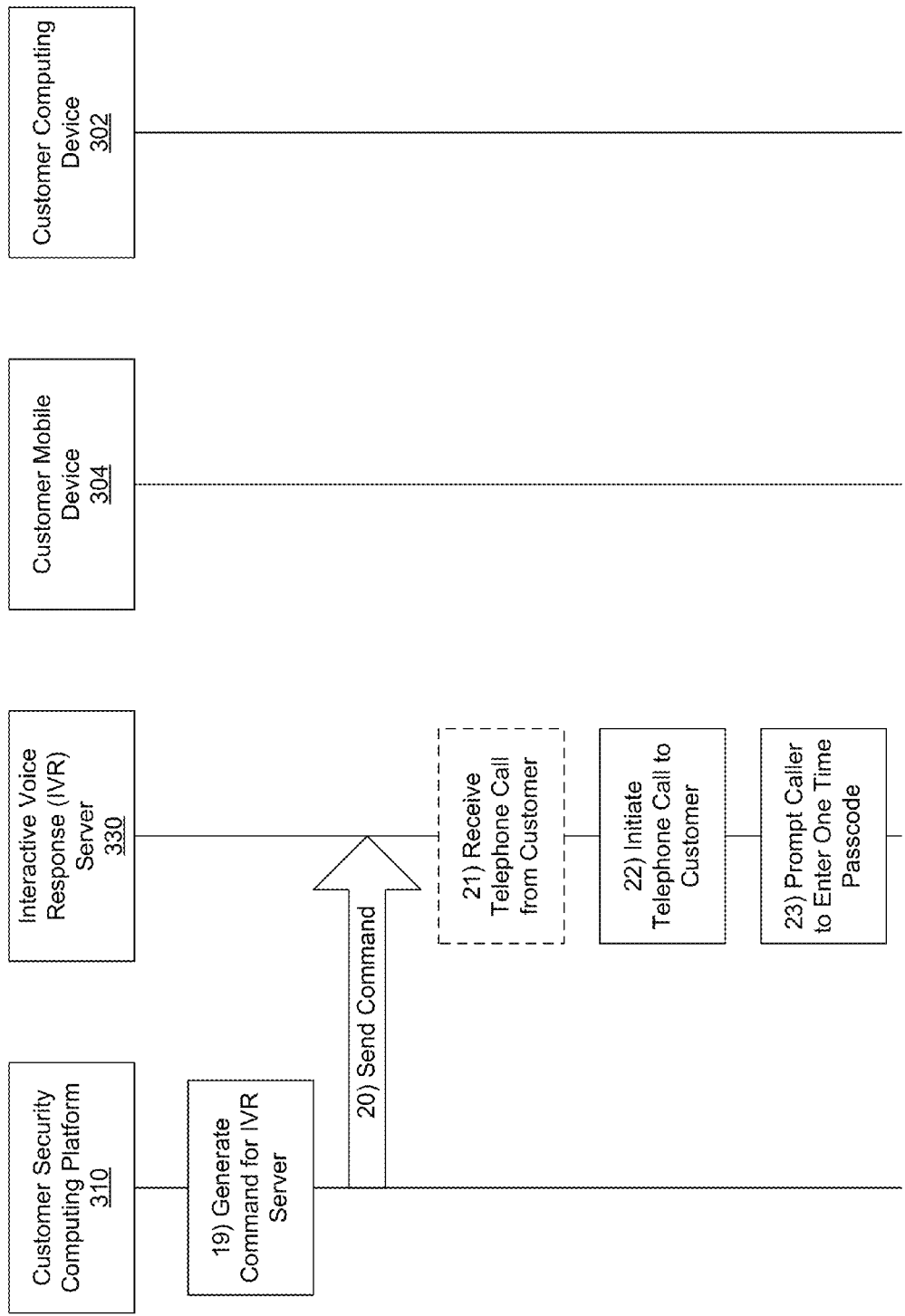
Figure 4F:
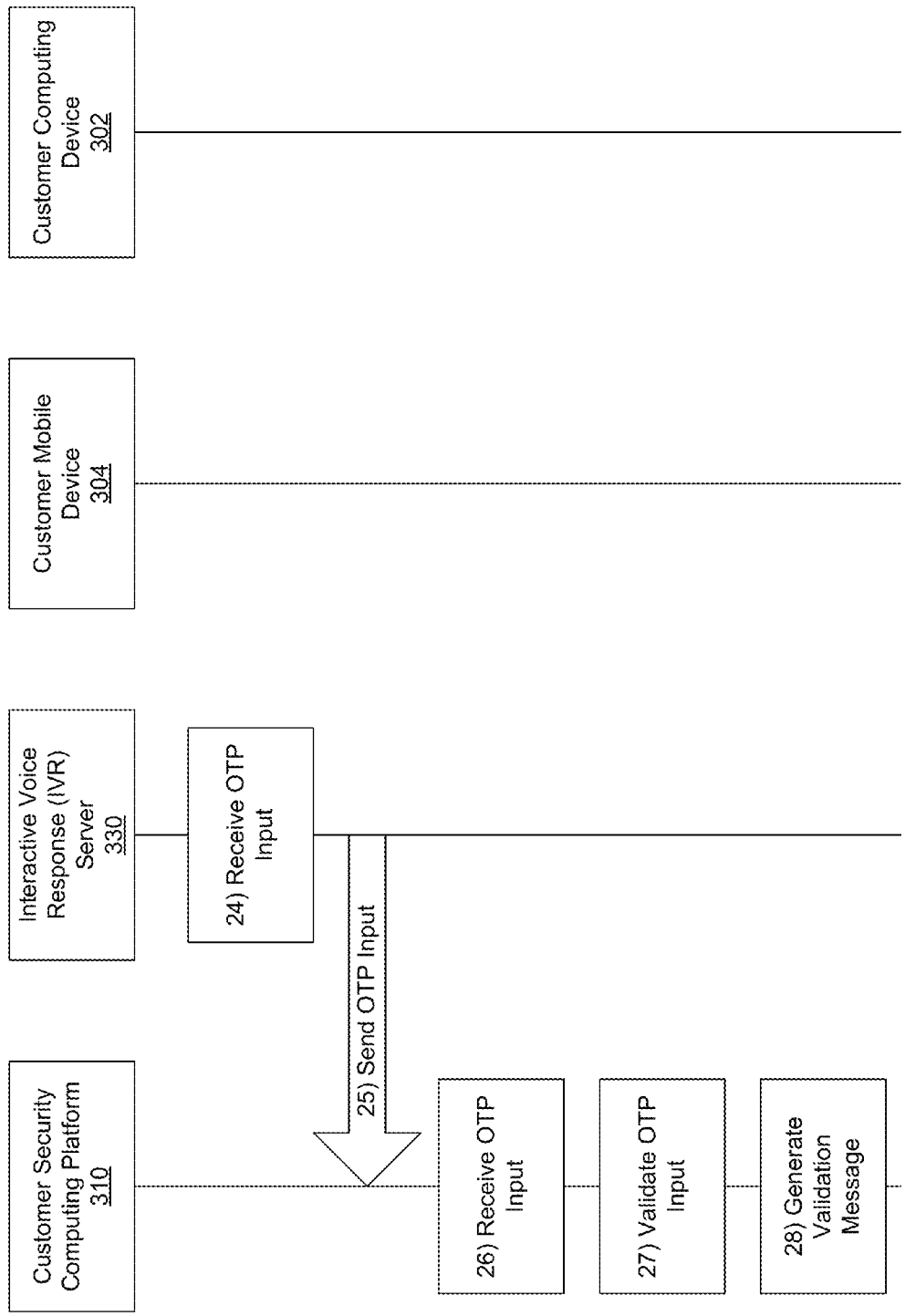
Figure 4H:
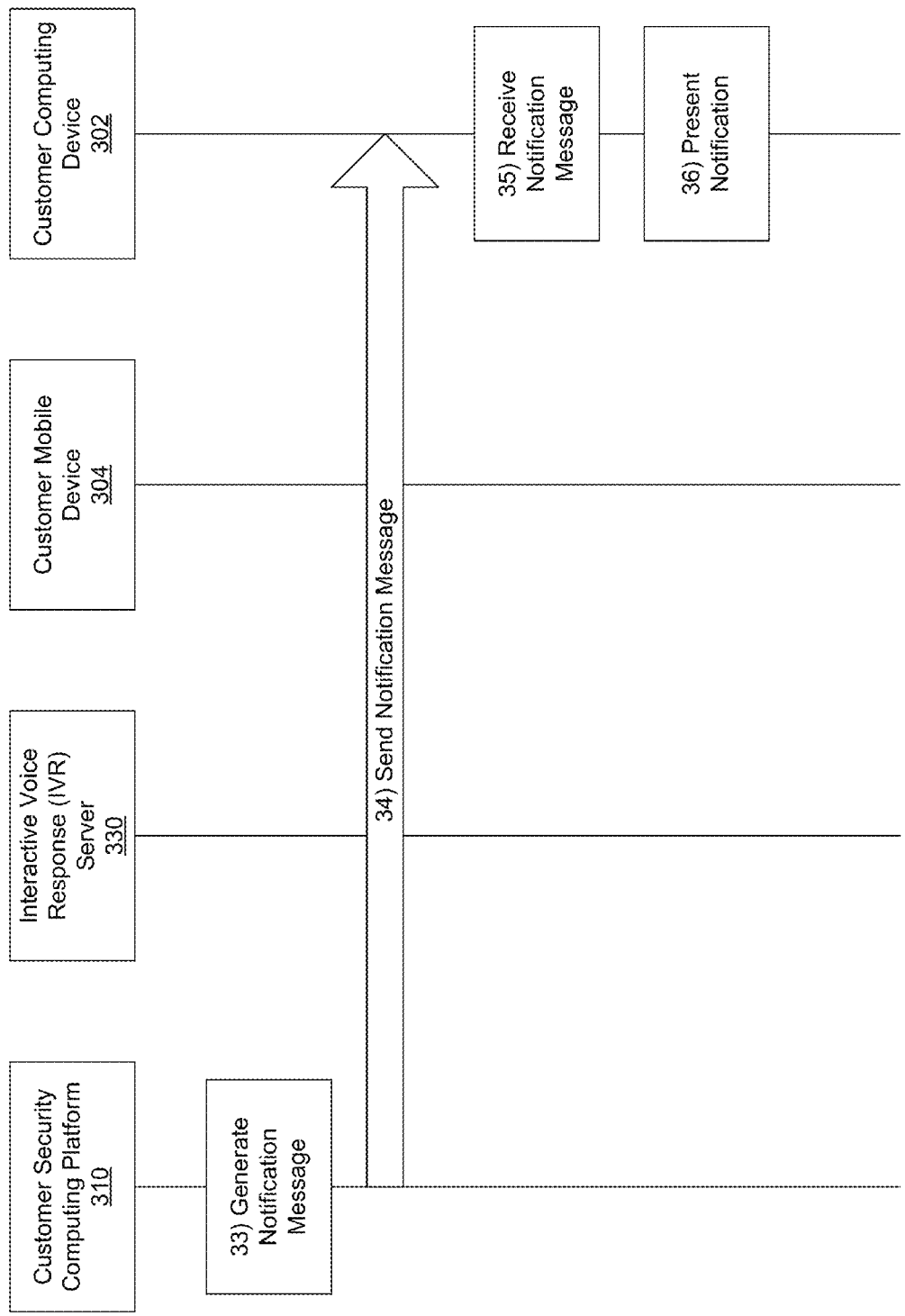

Referring to FIG. 4E, at step 19, customer security computing platform 310 may generate one or more commands for IVR server 330. For example, in some instances, customer security computing platform 310 may generate one or more commands for IVR server 330 that are configured to cause IVR server 330 to initiate a call to the customer who may be the user of customer computing device 302. For instance, such command(s) may include information identifying the customer's one or more registered phone numbers (which may, e.g., enable IVR server 330 to initiate a call to customer by dialing the customer's one or more registered phone numbers) and/or information defining a valid one-time passcode (which may, e.g., identify the one-time passcode provided to the user of customer computing device 302 so as to enable IVR server 330 to validate one-time passcode input provided to IVR server 330 after a phone call to the customer is initiated). In other instances, customer security computing platform 310 may generate one or more commands for IVR server 330 that are configured to cause IVR server 330 to wait for and/or receive a telephone call from the customer. For instance, such command(s) may include information identifying the customer's one or more registered phone numbers (which may, e.g., enable IVR server 330 to identify a call received from the customer), information defining a valid one-time passcode, and/or information defining an expected timeframe for receiving the customer's call (e.g., within the next fifteen minutes, within the next one hour, and/or otherwise within a predetermined time period).

At step 20, customer security computing platform 310 may send the one or more commands to IVR server 330. In some instances, in sending the one or more commands to IVR server 330, customer security computing platform 310 may cause IVR server 330 to initiate a telephone call to the customer who may be the user of customer computing device 302 (and who may, e.g., also be referred to as a "caller," for instance, in relation to IVR server 330). For example, the one or more commands generated and sent by customer security computing platform 310 to IVR server 330 may be configured to cause IVR server 330 to initiate a telephone call to the customer, as discussed above. In these instances, the telephone call to the customer may thus be initiated by IVR server 330 in response to and/or otherwise based on customer security computing platform 310 receiving the click-to-call request from customer computing device 302. In some instances, the telephone call may be initiated to a registered telephone number associated with the user of the user computing device. For example, customer security computing platform 310 may send one or more commands to IVR server 330 that may cause IVR server 330 to initiate a telephone call to one or more phone numbers that have been pre-registered by the user of customer computing device 302 as belonging to the user of customer computing device 302. In other instances, the telephone call may be initiated to a telephone number provided by the user of the user computing device in response to a prompt generated by the server computing device after receiving the click-to-call request. For example, customer security computing platform 310 may send one or more commands to IVR server 330 that may cause IVR server 330 to initiate a telephone call to a telephone number provided by the user of customer computing device 302 in response to a prompt generated by customer security computing platform 310 after customer security computing platform 310 receives the click-to-call request from customer computing device 302.

In other instances, in sending the one or more commands to IVR server 330, customer security computing platform 310 may send, to IVR server 330, information associated with an expected telephone call corresponding to the click-to-call request. For example, in sending the one or more commands to IVR server 330, customer security computing platform 310 may send, to IVR server 330, information causing IVR server 330 to expect and/or receive a telephone call from the user of customer computing device 302. Such information may, for instance, include information identifying the customer's one or more registered phone numbers (which may, e.g., enable IVR server 330 to identify a call received from the customer), information defining a valid one-time passcode, and/or information defining an expected timeframe for receiving the customer's call, as discussed above.

At step 21, IVR server 330 may receive a telephone call. For example, in instances in which customer security computing platform 310 sent one or more commands to IVR server 330 that included information associated with an expected phone call corresponding to the click-to-call request, IVR server 330 may receive a telephone call from the customer (who may, e.g., be using customer computing device 302).

Alternatively, at step 22, IVR server 330 may initiate a telephone call. For example, in instances in which customer security computing platform 310 sent one or more commands to IVR server 330 that were configured to cause IVR server 330 to initiate a telephone call to the customer, IVR server 330 may initiate a telephone call to the customer (who may, e.g., be using customer computing device 302).

At step 23, IVR server 330 may prompt the caller to enter the one-time passcode. For example, at step 23, IVR server 330 may play back and/or otherwise present one or more audio prompts to the caller (e.g., from which the telephone call was received at step 21 or to which the telephone call was placed at step 22), and such audio prompts may ask the caller to enter a one-time passcode to be authenticated to a user account. Although in some instances, the other party on the telephone call may be considered a callee (e.g., where IVR server 330 initiated the telephone call) rather than a caller (e.g., where IVR server 330 received the telephone call), for ease of reference, these terms may be used interchangeably in this disclosure, and the other party on the telephone call with IVR server 330 may be referred to simply as a "caller."

At step 24, IVR server 330 may receive one-time-passcode input from the caller. For example, at step 24, one-time-passcode input from the caller as one or more dual-tone multi-frequency (DTMF) signals corresponding to touch-tone selections made by the caller in entering a passcode. After receiving such signals, IVR server 330 may decode the signals to determine the passcode entered by the caller, and the passcode entered by the caller may make up the one-time-passcode input received at step 24. At step 25, IVR server 330 may send the one-time-passcode input to customer security computing platform 310 for validation. For example, at step 25, IVR server 330 may send information specifying the passcode entered by the caller (e.g., based on the signals decoded by IVR server 330 at step 24).

At step 26, customer security computing platform 310 may receive the one-time passcode input from IVR server 330. For example, at step 26, customer security computing platform 310 may receive one-time-passcode input from IVR server 330, and the one-time-passcode input received from IVR server 330 may correspond to input provided to IVR server 330 by a caller, as illustrated in the examples discussed above.

At step 27, customer security computing platform 310 may validate the one-time passcode input. For example, at step 27, customer security computing platform 310 may validate the one-time-passcode input based on the one-time passcode provided to the user of the user computing device. In validating the one-time-passcode input received from IVR server 330, customer security computing platform 310 may, for instance, compare the one-time-passcode input received from IVR server 330 with the one-time passcode provided to the user of customer computing device 302 (e.g., at step 15 and/or at step 16 above) to determine whether the one-time-passcode input received from IVR server 330 matches the one-time passcode provided to the user of customer computing device 302. If customer security computing platform 310 determines that the one-time-passcode input received from IVR server 330 does not match the one-time passcode provided to the user of customer computing device 302, then customer security computing platform 310 may generate an error message and provide the error message to IVR server 330, which may, for instance, cause IVR server 330 to prompt the caller to provide corrected input and/or may disconnect the caller. Alternatively, if customer security computing platform 310 determines that the one-time-passcode input received from IVR server 330 does match the one-time passcode provided to the user of customer computing device 302, then the event sequence may continue as illustrated (e.g., in FIG. 4F) and customer security computing platform 310 may proceed with generating a validation message, as discussed below.

At step 28, customer security computing platform 310 may generate a validation message. For example, at step 28, customer security computing platform 310 may generate a validation message that may include information that, when received by IVR server 330, may cause IVR server 330 to authenticate the caller as the user of customer computing device 302. For instance, the validation message may include information indicating the one-time-passcode input provided by the caller to IVR server 330 is valid. Additionally or alternatively, the validation message may include information that causes IVR server 330 to provide the caller with access to account information associated with the user of customer computing device 302 and/or otherwise allows the caller to interact with one or more accounts associated with the user of customer computing device 302.

At step 29, customer security computing platform 310 may send the validation message to IVR server 330. For example, in response to validating the one-time-passcode input (e.g., at step 28), customer security computing platform 310 may cause IVR server 330 to authenticate the caller as the user of the user computing device by sending the validation message to IVR server 330. As discussed above, the validation message may, for example, include information that is configured to cause IVR server 330 to authenticate the caller as the user of customer computing device 302.

In some embodiments, causing the IVR server to authenticate the caller as the user of the user computing device may include causing the IVR server to route the caller to a specific endpoint determined by the server computing device. For example, causing IVR server 330 to authenticate the caller as the user of customer computing device 302 may, in some instances, include causing IVR server 330 to route the caller to a specific endpoint that is determined by customer security computing platform 310. Such an endpoint may, for instance, be a specific customer service representative that is determined by customer security computing platform 310 and/or another endpoint, such as an automated line (e.g., an automated voice biometric enrollment line), that may be selected by and/or otherwise determined by customer security computing platform 310. In instances where customer security computing platform 310 causes IVR server 330 to route the caller to a specific endpoint determined by customer security computing platform 310, the validation message that is generated and sent by customer security computing platform 310 to IVR server 330 may include information identifying the endpoint to which the caller is to be routed.

In some embodiments, causing the IVR server to authenticate the caller as the user of the user computing device may include sending contextual information associated with the user's interaction with the customer portal to the IVR server. For example, causing IVR server 330 to authenticate the caller as the user of customer computing device 302 may include sending contextual information associated with the user's interaction with the customer portal to IVR server 330. Such contextual information may, for instance, identify particular features of the customer portal that the user of customer computing device 302 was accessing and/or interacting with and may be used by customer security computing platform 310 and/or IVR server 330 in identifying and/or otherwise determining one or more predicted and/or actual needs of the user of customer computing device 302.

In some embodiments, the IVR server may be configured to use the contextual information in routing the caller to an endpoint. For example, IVR server 330 may be configured to use the contextual information (which may, e.g., be sent to IVR server 330 by customer security computing platform 310) in routing the caller to an endpoint. For instance, IVR server 330 may use the contextual information in selecting and/or otherwise determining an endpoint to which IVR server 330 may route the caller, such as a particular customer service representative, call center, or line to which IVR server 330 may route the caller.

In some embodiments, the IVR server may be configured to provide the contextual information to a customer service representative to which the caller is routed. For example, IVR server 330 may be configured to provide the contextual information (which may, e.g., be sent to IVR server 330 by customer security computing platform 310) to a customer service representative to which the caller is routed. Such contextual information may, for instance, be used by such a customer service representative to better assist the caller, as the customer service representative may be able to pick up from the point where the caller left off while interacting with the customer portal on customer computing device 302. For example, if the customer using customer computing device 302 is and/or was interacting with a customer service representative via a text chat session (e.g., on customer computing device 302 prior to submitting the click-to-call request), meta-data from the customer's text chat session may, in some instances, be carried over and/or otherwise provided by IVR server 330 to the customer service representative that the customer is connected to in the telephone session (which may, e.g., be initiated as a result of the click-to-call request, as discussed above).

At step 30, IVR server 330 may receive the validation message from customer security computing platform 310. As discussed above, the validation message may, for example, include information that is configured to cause IVR server 330 to authenticate the caller as the user of customer computing device 302.

At step 31, IVR server 330 may set one or more authentication flags. For example, at step 31, IVR server 330 may set one or more authentication flags based on the validation message received from customer security computing platform 310. In setting the one or more authentication flags, IVR server 330 may, for instance, set and/or update one or more flags that allow the caller to conduct transactions, access account information, and/or otherwise interact with IVR server 330 and/or one or more customer service representatives without entering, submitting, and/or otherwise providing further credentials for validation and/or authentication. In this way, IVR server 330 and customer security computing platform 310 may work in combination to carry over the authentication level from the user's web session on the customer portal (e.g., provided by customer security computing platform 310 to customer computing device 302) to the user's phone session (e.g., provided by IVR server 330).

At step 32, IVR server 330 may route the telephone call. For example, at step 32, IVR server 330 may route the telephone call to at least one specific endpoint. In some instances, IVR server 330 may route the telephone call to an endpoint based on information included in the validation message received from customer security computing platform 310, as discussed above. In these way, the context of the customer's web session may be maintained, as IVR server 330 may route the call based on the customer's activities during his or her web session on the customer portal (e.g., provided by customer security computing platform 310 to customer computing device 302). In some instances, the validation message (which may, e.g., be received by IVR server 330 at step 30) may include information directing the customer's call to a specific endpoint. In other instances, IVR server 330 may analyze contextual information included in the validation message and may select and/or otherwise determine an endpoint to route the customer's telephone call to based on the analysis of the contextual information. In instances in which the customer using customer computing device 302 is and/or was interacting with a customer service representative via a text chat session on customer computing device 302, IVR server 330 may, in some instances, route the telephone call to the specific customer service representative that the customer was previously interacting with via the text chat session. For example, IVR server 330 may route the telephone call in this way based on receiving a request from the customer using customer computing device 302 to be placed into contact with the specific customer service representative that the customer was interacting with via the text chat session.

At step 33, customer security computing platform 310 may generate a notification message. For example, at step 33, customer security computing platform 310 may generate a notification message indicating that customer security computing platform 310 has validated the one-time passcode entered by the customer over the phone, that the customer has been successfully authenticated in the phone session as a result of this validation, and/or that the customer's call is being routed to a specific endpoint.

Figure 6:
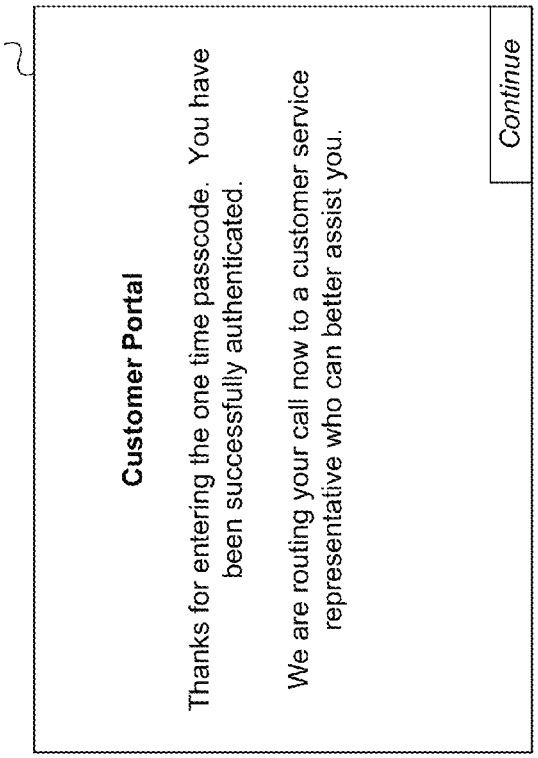
FIGS. 5 and 6 depict example graphical user interfaces for providing enhanced user authentication functionalities in accordance with one or more example embodiments.

At step 34, customer security computing platform 310 may send the notification message to customer computing device 302. At step 35, customer computing device 302 may receive the notification message, and at step 36, customer computing device 302 may present a notification based on the notification message received from customer security computing platform 310. In presenting the notification, customer computing device 302 may, for example, display, cause to be displayed, and/or otherwise present one or more graphical user interfaces that include the contents of the notification message and/or otherwise allow the user of customer computing device 302 to view the contents of the notification message. For example, customer computing device 302 may present a graphical user interface similar to graphical user interface 600, which is illustrated in FIG. 6. As seen in FIG. 6, graphical user interface 600 may include one or more fields, controls, and/or other elements that are configured to present the notification message to the user of customer computing device 302 and/or provide other information explaining, for instance, that the one-time passcode entered by the customer has been validated, that the customer has been successfully authenticated, and/or that the customer's call is being routed to a specific endpoint.

Figure 7:
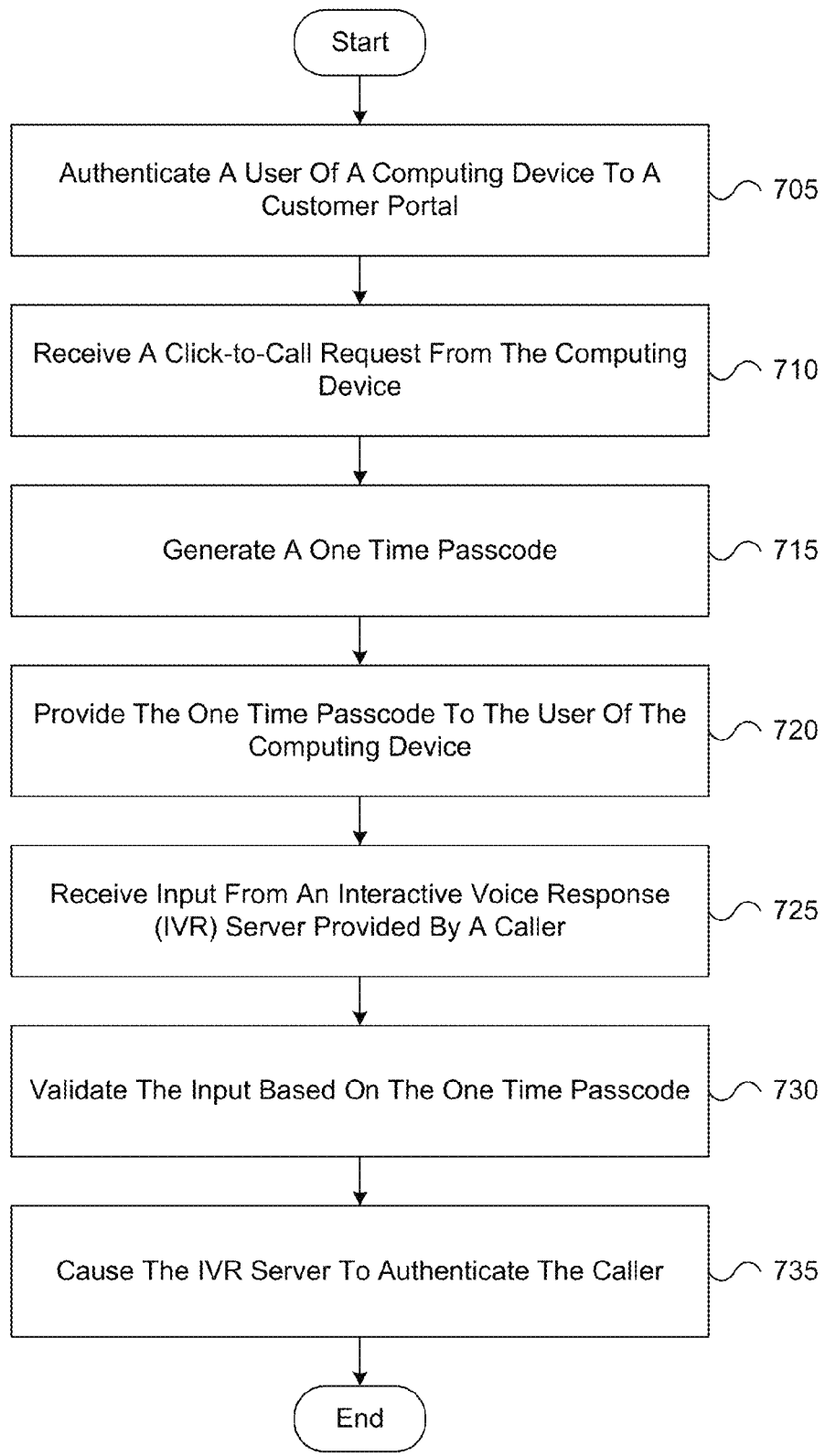
FIG. 7 depicts an illustrative method for providing enhanced user authentication functionalities in accordance with one or more example embodiments.

FIG. 7 depicts an illustrative method for providing enhanced user authentication functionalities in accordance with one or more example embodiments. Referring to FIG. 7, at step 705, a computing platform may authenticate a user of a computing device to a customer portal. At step 710, the computing platform may receive a click-to-call request from the computing device. At step 715, the computing platform may generate a one-time passcode. At step 720, the computing platform may provide the one-time passcode to the user of the computing device. At step 725, the computing platform may receive, from an IVR server, input provided by a caller. At step 730, the computing platform may validate the input based on the one-time passcode. At step 735, the computing platform may cause the IVR server to authenticate the caller.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
   authenticating, by a server computing device, a user of a user computing device to a customer portal provided by the server computing device;
   receiving, by the server computing device, a click-to-call request from the user computing device;
   in response to receiving the click-to-call request from the user computing device, generating, by the server computing device, a one-time passcode for the user of the user computing device;
   providing, by the server computing device, the one-time passcode to the user of the user computing device;
   receiving, by the server computing device, one-time-passcode input from an interactive voice response (IVR) server, the one-time-passcode input corresponding to input provided to the IVR server by a caller;
   validating, by the server computing device, the one-time-passcode input based on the one-time passcode provided to the user of the user computing device; and
   in response to validating the one-time-passcode input, causing, by the server computing device, the IVR server to authenticate the caller as the user of the user computing device.

2. The method of claim 1, wherein providing the one-time passcode to the user of the user computing device includes sending the one-time passcode to the user computing device.

3. The method of claim 1, wherein providing the one-time passcode to the user of the user computing device includes sending the one-time passcode to one or more registered addresses associated with the user of the user computing device.

4. The method of claim 3, wherein the one or more registered addresses associated with the user of the user computing device include at least one email address associated with the user of the user computing device.

5. The method of claim 3, wherein the one or more registered addresses associated with the user of the user computing device include at least mobile telephone number associated with the user of the user computing device.

6. The method of claim 1, further comprising:
   prior to receiving the one-time-passcode input from the IVR server, causing, by the server computing device, the IVR server to initiate a telephone call to the caller.

7. The method of claim 6, wherein the telephone call is initiated to a registered telephone number associated with the user of the user computing device.

8. The method of claim 6, wherein the telephone call is initiated to a telephone number provided by the user of the user computing device in response to a prompt generated by the server computing device after receiving the click-to-call request.

9. The method of claim 1, further comprising:
   prior to receiving the one-time-passcode input from the IVR server, sending, by the server computing device, and to the IVR server, information associated with an expected telephone call corresponding to the click-to-call request.

10. The method of claim 1, wherein causing the IVR server to authenticate the caller as the user of the user computing device includes causing the IVR server to route the caller to a specific endpoint determined by the server computing device.

11. The method of claim 1, wherein causing the IVR server to authenticate the caller as the user of the user computing device includes sending contextual information associated with the user's interaction with the customer portal to the IVR server.

12. The method of claim 11, wherein the IVR server is configured to use the contextual information in routing the caller to an endpoint.

13. The method of claim 11, wherein the IVR server is configured to provide the contextual information to a customer service representative to which the caller is routed.

14. A system, comprising:
    at least one processor; and
    memory storing computer-readable instructions that, when executed by the at least one processor, cause the system to:
    authenticate a user of a user computing device to a customer portal provided by the system;

receive a click-to-call request from the user computing device;

in response to receiving the click-to-call request from the user computing device, generate a one-time passcode for the user of the user computing device;

provide the one-time passcode to the user of the user computing device;

receive one-time-passcode input from an interactive voice response (IVR) server, the one-time-passcode input corresponding to input provided to the IVR server by a caller;

validate the one-time-passcode input based on the one-time passcode provided to the user of the user computing device; and in response to validating the one-time-passcode input, cause the IVR server to authenticate the caller as the user of the user computing device.

15. The system of claim 14, wherein providing the one-time passcode to the user of the user computing device includes sending the one-time passcode to the user computing device.

16. The system of claim 14, wherein providing the one-time passcode to the user of the user computing device includes sending the one-time passcode to one or more registered addresses associated with the user of the user computing device.

17. The system of claim 16, wherein the one or more registered addresses associated with the user of the user computing device include at least one email address associated with the user of the user computing device.

18. The system of claim 16, wherein the one or more registered addresses associated with the user of the user computing device include at least mobile telephone number associated with the user of the user computing device.

19. The system of claim 14, wherein the memory stores additional computer-readable instructions that, when executed by the at least one processor, further cause the system to:

prior to receiving the one-time-passcode input from the IVR server, cause the IVR server to initiate a telephone call to the caller.

20. One or more non-transitory computer-readable media storing instructions that, when executed by a computing platform comprising at least one processor and memory, cause the computing platform to:

authenticate a user of a user computing device to a customer portal provided by the computing platform;

receive a click-to-call request from the user computing device;

in response to receiving the click-to-call request from the user computing device, generate a one-time passcode for the user of the user computing device;

provide the one-time passcode to the user of the user computing device;

receive one-time-passcode input from an interactive voice response (IVR) server, the one-time-passcode input corresponding to input provided to the IVR server by a caller;

validate the one-time-passcode input based on the one-time passcode provided to the user of the user computing device; and in response to validating the one-time-passcode input, cause the IVR server to authenticate the caller as the user of the user computing device.

\* \* \* \* \*